United States Patent [19]
Ruiz

[11] Patent Number: 5,916,306
[45] Date of Patent: Jun. 29, 1999

[54] COMMUNICATION PROTOCOL FOR A ROUTER-BASED BUILDING AUTOMATION AND CONTROL NETWORK

[75] Inventor: John Ruiz, New Berlin, Wis.

[73] Assignee: Johnson Controls Technology, Plymouth, Mich.

[21] Appl. No.: 08/749,225

[22] Filed: Nov. 14, 1996

[51] Int. Cl.[6] .............................. G06F 13/38; G06F 15/17
[52] U.S. Cl. .......................... 709/242; 709/245; 709/248
[58] Field of Search ........................ 395/200.36, 200.75, 395/200.33, 200.67, 200.72, 200.78; 370/400

[56] References Cited

U.S. PATENT DOCUMENTS

| | | | |
|---|---|---|---|
| 4,918,690 | 4/1990 | Markula, Jr. et al. .................. | 370/400 |
| 5,513,324 | 4/1996 | Dolin, Jr. et al. .................. | 395/200.67 |
| 5,606,705 | 2/1997 | Randall et al. ..................... | 395/200.33 |
| 5,737,529 | 4/1998 | Dolin, Jr. et al. .................. | 395/200.75 |
| 5,754,779 | 5/1998 | Dolin, Jr. et al. .................. | 395/200.36 |

OTHER PUBLICATIONS

Ginsparg et al., "Automatic Programming of Communications Software Via Nonprocedural Descriptions", IEEE, pp. 1343–1347, 1982.

*Primary Examiner*—Mark H. Rinehart
*Attorney, Agent, or Firm*—Quarles & Brady, L.L.P.

[57] ABSTRACT

A method and apparatus for improving the performance of Building Environmental Control networks by efficiently storing network routing information and by checking that the data exchanged between two computer applications operating on the network is consistent. The present invention efficiently stores network routing information by having the Building Environmental control network routers only store routing information when that router acts as a bridge for communicating that message further downstream. The present invention also checks that the exchange of data between two building environmental control applications is done by forming a special identifier from the existing data and using that identifier to validate data exchanges. The special identifier is formed by segmenting one field found within the data and having a portion of that segmented field be indicative of the identifying name of the data.

13 Claims, 9 Drawing Sheets

FIG. 1 PRIOR ART

| Object Name | BACnet Object Identifier ||||||||||||||||||||||||||||||||
|---|---|---|---|---|---|---|---|---|---|---|---|---|---|---|---|---|---|---|---|---|---|---|---|---|---|---|---|---|---|---|---|
| | Object Type |||||||||||| Instance Number ||||||||||||||||||||
| Bit Num | 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
| Supply Air Temp 1 | 0 | 0 | 0 | 0 | 0 | 0 | 0 | 0 | 0 | 0 | 1 | 0 | 0 | 0 | 0 | 0 | 0 | 0 | 0 | 0 | 0 | 0 | 0 | 0 | 0 | 0 | 0 | 0 | 0 | 0 | 0 | 0 |
| Return Air Temp 1 | 0 | 0 | 0 | 0 | 0 | 0 | 0 | 0 | 0 | 0 | 1 | 0 | 0 | 0 | 0 | 0 | 0 | 0 | 0 | 0 | 0 | 0 | 0 | 0 | 0 | 0 | 0 | 0 | 0 | 0 | 0 | 1 |
| Damper Position | 0 | 0 | 0 | 0 | 0 | 0 | 0 | 0 | 0 | 0 | 1 | 0 | 0 | 0 | 0 | 0 | 0 | 0 | 0 | 0 | 0 | 0 | 0 | 0 | 0 | 0 | 0 | 0 | 0 | 0 | 1 | 1 |
| Zone Setpoint | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 1 | 0 | 0 |

FIG. 2 PRIOR ART

| Object Name | BACnet Object Identifier ||||||||||||||||||||||||||||||||
|---|---|---|---|---|---|---|---|---|---|---|---|---|---|---|---|---|---|---|---|---|---|---|---|---|---|---|---|---|---|---|---|
| | Object Type |||||||||||| Instance Number ||||||||||||||||||||
| Bit Num | 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
| Duct Humidity | 0 | 0 | 0 | 0 | 0 | 0 | 0 | 0 | 0 | 0 | 1 | 0 | 0 | 0 | 0 | 0 | 0 | 0 | 0 | 0 | 0 | 0 | 0 | 0 | 0 | 0 | 0 | 0 | 0 | 0 | 0 | 0 |
| Static Pressure | 0 | 0 | 0 | 0 | 0 | 0 | 0 | 0 | 0 | 0 | 1 | 0 | 0 | 0 | 0 | 0 | 0 | 0 | 0 | 0 | 0 | 0 | 0 | 0 | 0 | 0 | 0 | 0 | 0 | 0 | 0 | 1 |
| Supply Air Temp 1 | 0 | 0 | 0 | 0 | 0 | 0 | 0 | 0 | 0 | 0 | 1 | 0 | 0 | 0 | 0 | 0 | 0 | 0 | 0 | 0 | 0 | 0 | 0 | 0 | 0 | 0 | 0 | 0 | 0 | 0 | 1 | 0 |
| Return Air Temp 1 | 0 | 0 | 0 | 0 | 0 | 0 | 0 | 0 | 0 | 0 | 1 | 0 | 0 | 0 | 0 | 0 | 0 | 0 | 0 | 0 | 0 | 0 | 0 | 0 | 0 | 0 | 0 | 0 | 0 | 0 | 1 | 1 |
| Damper Position | 0 | 0 | 0 | 0 | 0 | 0 | 0 | 0 | 0 | 0 | 1 | 0 | 0 | 0 | 0 | 0 | 0 | 0 | 0 | 0 | 0 | 0 | 0 | 0 | 0 | 0 | 0 | 0 | 0 | 1 | 0 | 1 |
| Zone Setpoint | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 1 | 1 | 0 |

FIG. 9

| Object Name | BACnet Object Identifier ||||||||||||||||||||||||||||||||
|---|---|---|---|---|---|---|---|---|---|---|---|---|---|---|---|---|---|---|---|---|---|---|---|---|---|---|---|---|---|---|---|
| | Object Type |||||||||| Instance Number |||||||||||||||||| Check Digit ||||
| Bit Num | 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
| Supply Air Temp 1 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 1 | 0 | 0 | 0 | 0 | 1 | 1 |
| Return Air Temp 1 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 1 | 0 | 0 | 0 | 0 | 0 | 0 | 1 |
| Damper Position | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 1 | 1 | 0 | 0 | 0 | 0 | 1 | 1 | 0 |
| Zone Setpoint | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 1 | 0 | 0 | 0 | 0 | 0 | 1 | 0 | 0 | 0 |

FIG. 10

| Object Name | BACnet Object Identifier ||||||||||||||||||||||||||||||||
|---|---|---|---|---|---|---|---|---|---|---|---|---|---|---|---|---|---|---|---|---|---|---|---|---|---|---|---|---|---|---|---|
| | Object Type |||||||||| Instance Number |||||||||||||||||| Check Digit ||||
| Bit Num | 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
| Duct Humidity | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 1 | 0 | 0 | 0 | 0 | 1 | 1 |
| Static Pressure | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 1 | 0 | 0 | 1 | 0 | 1 | 0 | 0 |
| Supply Air Temp 1 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 1 | 1 | 0 | 0 | 0 | 1 | 1 | 1 |
| Return Air Temp 1 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 1 | 0 | 0 | 0 | 0 | 0 | 0 | 0 | 1 |
| Damper Position | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 1 | 0 | 1 | 0 | 0 | 0 | 1 | 1 | 0 |
| Zone Setpoint | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 1 | 1 | 1 | 0 | 0 | 0 | 1 | 0 | 0 | 0 |

COMMUNICATION PROTOCOL FOR A ROUTER-BASED BUILDING AUTOMATION AND CONTROL NETWORK

BACKGROUND OF THE INVENTION

1. Technical Field

The present invention relates generally to computer networks and more particularly to communications within a building automation and control network.

2. Discussion

Networks for building environmental control typically use the American Society of Heating Refrigeration and Air Conditioning Engineers (ASHRAE) Building Automation and Control Network (BACnet) Communications Protocol. The ASHRAE BACnet communications system allows a routing device on the network to build a "routing table" which indicates the next communications hop to any destination network. In large systems where there may be hundreds or thousands of destination networks, it is impractical to store all of the routes in the "routing table" due to the volatile memory needed to keep this information. The BACnet specification ignores this practical limitation.

The BACnet specification has a mechanism for advertising routes that consist of a router broadcasting to all other routers an "I-Am-Router-To-Network" message that indicates that it knows how to reach a particular destination network. This message is used by a receiving router to update its routing table and then it is rebroadcast to other downstream routers which perform the same process. In this way, every router knows how to reach every destination.

For the situation when one of these routers does not have enough room in its routing table to save the next hop to a particular destination, any message it receives to this destination network will be rejected since the router does not know where to forward the message. This situation will cause at least three additional messages to be sent on the network: (1) a message asking to locate the route to the destination network; (2) a message indicating that the network was found; and (3) a retransmission of the original message. This current system is relatively inefficient since many of the "I-Am-Router-To-Network" messages will not be used by a particular router if that router is not needed for sending a message to a destination network.

Another problem arising from the use of the ASHRAE BACnet communications protocol is data being misinterpreted by a remote device communicating with a local device due to changes to the database of the local device. This is possible since in BACnet, data is associated with a named object but referenced by a numeric identifier. Since there is no method to monitor that a name-to-identifier binding is valid, a device could be reconfigured such that a different named object is mapped to a previously used identifier. Other devices that use this identifier to read and write data have no way of knowing that the database has been changed and that the data being referenced is associated with a different object.

For example, the current ASHRAE BACnet communication protocol approach would handle the data operations between device A and device B in the following manner which leads to faulty information being exchanged between the two devices. In this example of the current ASHRAE BACnet approach, device B has a set of objects configured into its database as shown in FIG. 1. Device A would like to read the Supply Air Temperature entry. It does this by binding to the object using a BACnet WhoHas message. The request for this message contains the text "Supply Air Temp 1". The response from device B contains the object identifier of the value 00400001 (in hexadecimal; and in binary the value would be as shown in the entry for the "Supply Air Temp 1" entry in FIG. 1). This response is stored by Device A for later use.

Device A uses 00400001 in a ReadProperty message to read the "Supply Air Temp 1". This message only accepts an object identifier as an argument, it will not accept a text name according to the ASHRAE BACnet approach.

After device A has read the "Supply Air Temp 1" value, the data within device B's database is changed in this example to add a new application. The new database of device B is shown in FIG. 2. This new database has the object "Duct Humidity" with the same instance number as the instance number used in the former database of device B for "Supply Air Temp 1".

Device A uses 00400001 in a ReadProperty message to read the "Supply Air Temp 1", but since the database has been changed, Device B now returns the "Duct Humidity". Device B has no way to know that this was not the object that Device A wanted to read, and Device A does not know that the object identifier for "Supply Air Temp 1" has been changed. Device A may perform faulty operations based upon this faulty information.

SUMMARY OF THE INVENTION

The present invention is an apparatus for updating a message routing table with message routing information. The message routing information is indicative of a third message router being capable of transferring messages between a first message router and a message destination device. The present invention has a second message router being capable of exchanging messages with the first and third message routers. The second message router is coupled to the message routing table for storing the message routing information. A message bridge determinator is coupled to the second message router for determining whether the second message router is a bridge for transferring messages from the first message router to the message destination device through the third message router. Also, a table updater is coupled to the second message router and to the message bridge determinator and to the message routing table for updating the message routing table with the message routing information. The updating is done when the message bridge determinator determines that the second message router is the bridge. There is no updating when the message bridge determinator determines that the second message router is not the bridge.

The present invention also is a method for invalidating a data operation between a first and second computer application. The data operation is based on objects of the first and second computer applications. Each of the objects has an identifier number of a predefined length and a name. The present invention performs the step of determining a check number based on the name of a object. Then, the present invention segments the identifier number of the object into a reduced identifier number and a check number. The reduced identifier number and the check number are put together to form the predefined length. The reduced identifier number represents the same value as the identifier number of the object. The object is provided along with the segmented identifier number to the first and second computer applications. A data operation between the first and second computer application is invalidated when the object with the segmented identifier number of the first computer application does not match the object with the segmented identifier of the second object.

BRIEF DESCRIPTION OF THE DRAWINGS

Additional advantages and features of the present invention will become apparent from the subsequent description and the appended claims, taken in conjunction with the accompanying drawings, in which:

FIG. 1 is a selection from the object database in Device B in the current ASHRAE BACnet communications protocol format;

FIG. 2 is a selection from a new object database in Device B in the current ASHRAE BACnet communications protocol format;

FIG. 9 is a selection from an object database after the objects within the database have been segmented according to the present invention; and FIG. 10 is a selection from an object database which had been updated and whose objects have been segmented according to the present invention.

DETAILED DESCRIPTION OF THE PREFERRED EMBODIMENTS

Figure 3:
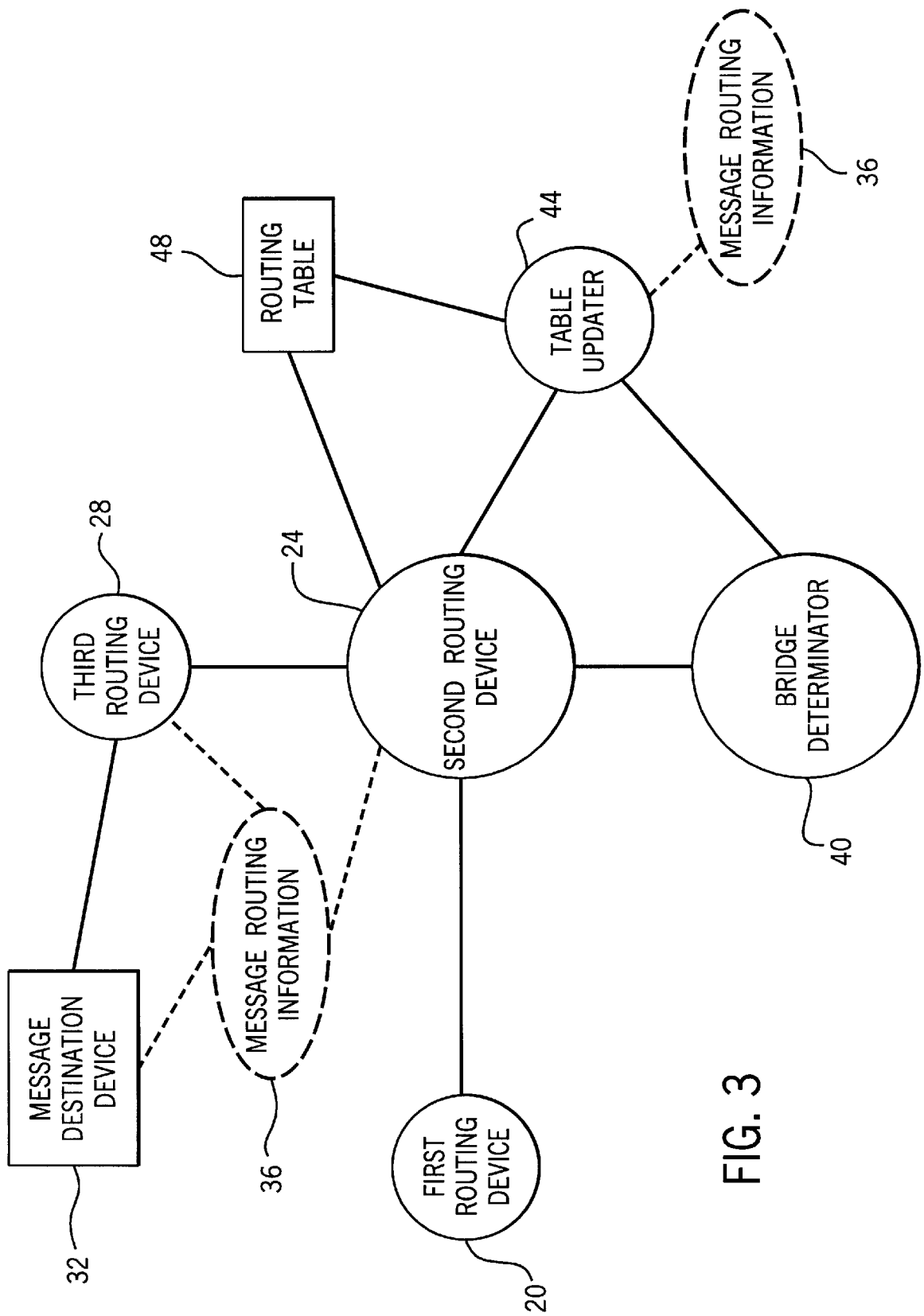
FIG. 3 is an entity relationship diagram depicting the various relationships existing among the routing devices of the present invention.

FIG. 3 is an entity relationship diagram showing the various connections and relationships among the entities of the present invention. A first routing device 20, a second routing device 24, and a third routing device 28 exist on a computer network which allows them to communicate among themselves in order to route messages to various destinations. In one embodiment of the present invention, the first routing device 20 wishes to know the routing path which a message must transverse in order for the message to be sent to a message destination device 32. The third routing device 28 provides message routing information 36 in order to facilitate the transfer of a message from the first routing device 20 to the message destination device 32. The message routing information 36 contains information that the third routing device 28 is a communications hop for transferring a message to the message destination device 32.

When the message routing information 36 produced from the third routing device 28 reaches the second routing device 24, the bridge determinator 40 of the second routing device 24 determines whether this second routing device 24 operates as a bridge in transferring the message routing information 36 from the third routing device 28 to the first routing device 20. If the second routing device does operate as a bridge, then the bridge determinator instructs the table updater 44 of the second routing device 24 to update the routing table 48 of the second routing device 24 with the message routing information 36. If the second routing device 24 does not act as a bridge as determined by the bridge determinator 40, then the routing table 48 is not updated with the message routing information 36.

Figure 4:
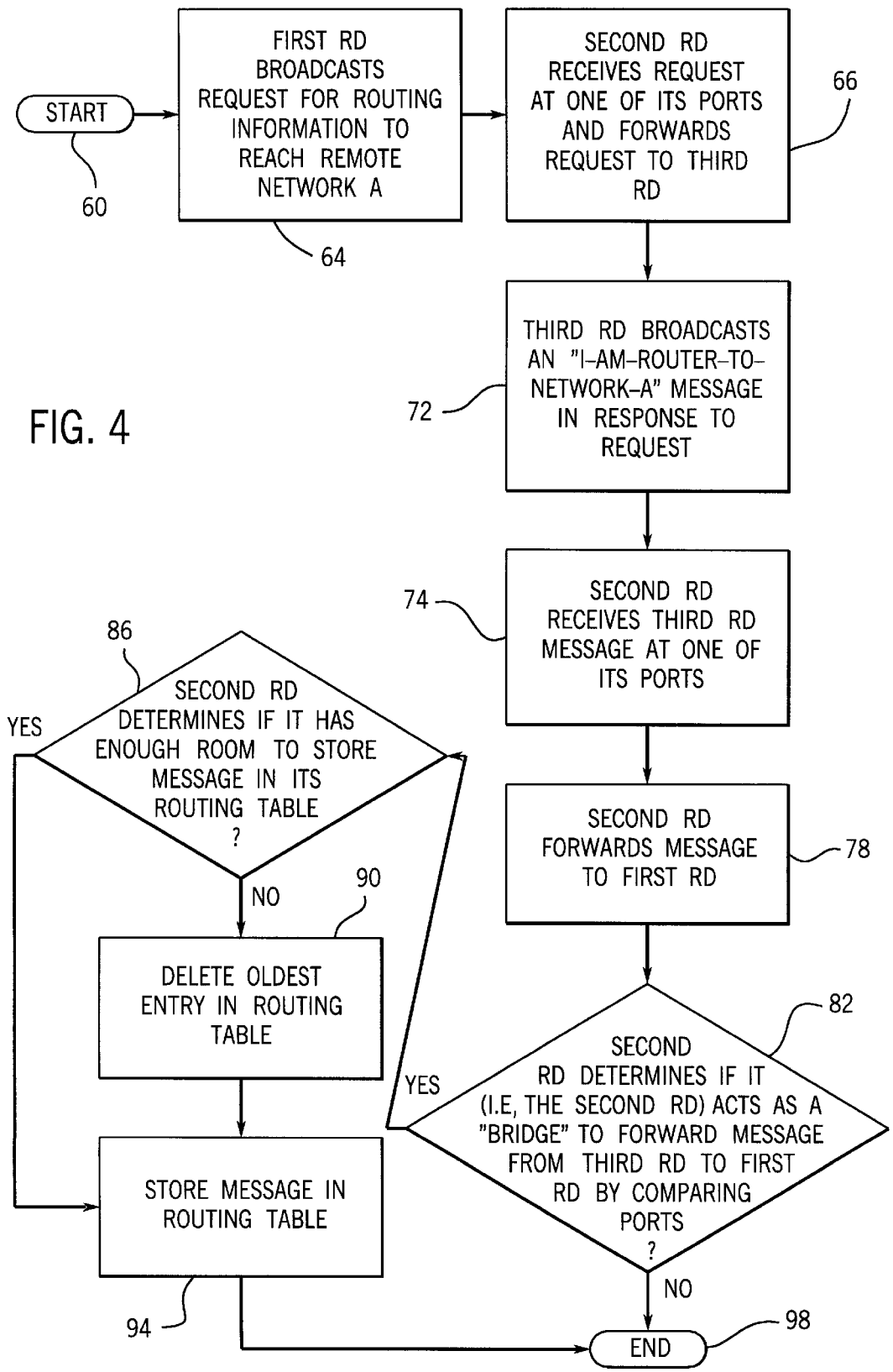
FIG. 4 is a flow chart showing the functions performed in determining whether a routing device updates its routing table.

FIG. 4 is a flow chart showing the sequence of operations which the entities of FIG. 3 perform in order to determine whether a routing table is to be updated. The start indicator 60 indicates that block 64 is first to be performed. At block 64, the first routing device broadcasts a request for how to route a message to reach a message destination device (such as, a remote network). At block 66, the second routing device receives the request at one of its communication ports and forwards the request to the third routing device. At block 72, the third routing device broadcasts an "I-Am-Router-To-Network-A" message in response to the request by the first routing device.

At block 74, the second routing device receives the third routing devices message at one of its communication ports. At block 78, the second routing device forwards the message to the first routing device. The second routing device at decision block 82 determines if it acts as a "bridge" to forward the message from the third routing device to the first routing device. The second routing device makes this determination by analyzing the ports by which it had transferred the message between the first and third routing devices. If different ports were used in the transfer then the second routing device was acting as a bridge. If different ports had not been used, then the second routing device was not acting as a bridge. If it does not act as a bridge, then processing terminates at the end block 98. However, if the second routing device does act as a bridge, then processing resumes at decision block 86.

The second routing device then determines at block 86 whether it has enough room to store the message in its routing table at decision block 84. If it does have enough storage room, then processing resumes at block 94. However, if the second routing device does not have enough room to store the message in its routing table, then it deletes the oldest entry in the routing table at block 90. At block 94, the second routing device stores the message in the routing table. Processing then terminates at the end block 98.

Figure 5:
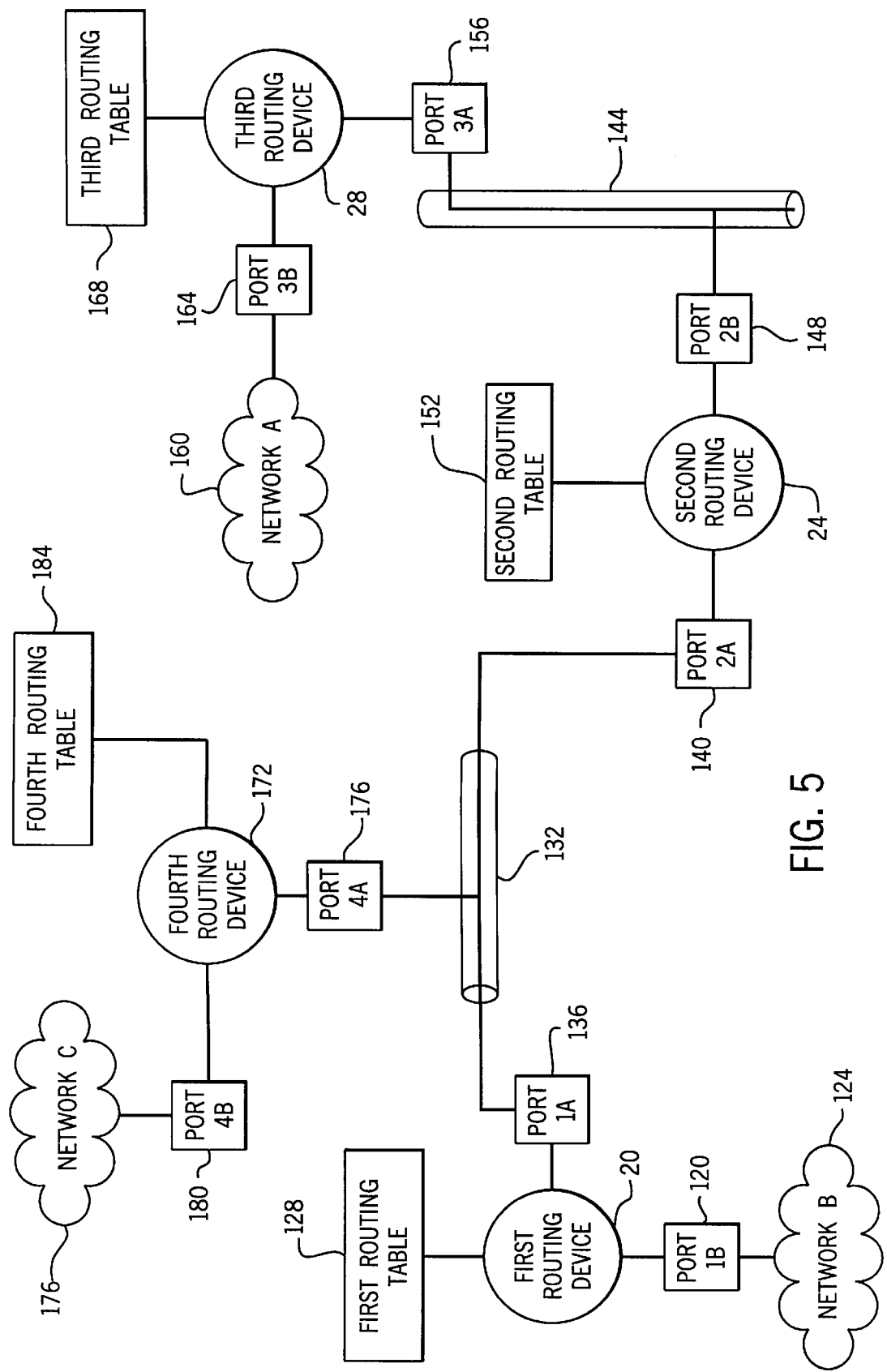
FIG. 5 is a network schematic diagram depicting one possible interconnection among the routing devices and the routing tables of the present invention.

FIG. 5 is a network schematic showing one possible network arrangement to practice the present invention. For this particular embodiment, the first routing device 20 has a computer port 1B 120 for communicating with a network B 124. The first routing device has routing information stored within its first routing table 128 and communicates over Ethernet cable 132 through its computer port 1A 136.

The second routing device 24 transfers messages onto the Ethernet cable 132 through its computer port 2A 140. The second routing device 24 transfers messages to a physically separate Ethernet cable 144 through its computer port 2B 148. The second routing table 152 contains the routing information specific to the second routing device 24.

The third routing device 28 can transfer messages onto the Ethernet cable 144 through its computer port 3A 156. The third routing device 28 can route messages to the message destination device, known here as network A 160 through its computer port 3B 164. The third routing table 168 contains the routing information specific to the third routing device 28.

The fourth routing device 172 can transfer information to the Ethernet cable 132 through its computer port 4A 176. The fourth routing device 172 can route messages to another message destination device, known as network C 176 through its computer port 4B 180. The fourth routing table 184 contains the routing information specific to the fourth routing device 172.

The first, second, third, and fourth routing tables (128, 152, 168, 184) contain the following information for the preferred embodiment in accordance with the ASHRAE BACnet specification: the address of the next routing device for a particular network; the network identifying number (in this example we are using letters instead of numbers); a reachability value which indicates the status of whether a particular router is reachable for routing messages and the communications port that connects to the remote network. It should be understood that the present invention is not limited to this particular table format but can contain less information than this such as not including the reachability field, as well as including more information about the network. It should be further understood that the present invention is not limited to the arrangement of the system as shown on FIG. 5 since FIG. 5 serves only as an example of the present invention. For example, another topology other than an Ethernet arrangement can be used such as an ARCnet topology.

The first routing device 20 broadcasts to all of the routing devices a request for routing information in order to reach network A 160. The second routing device 24 receives the request from the first routing device 20 at its computer port 2A 140. The second routing device notes that the request from the first routing device 20 arrived at its computer port 2A 140. The second routing device 24 then transfers the request to the third routing device 28. The third routing device 28 knows that it is a router for the network A 160 and accordingly the third routing device 28 sends back to the second routing device 24 an "I-Am-Router-ToNetwork-A" message.

The second routing device 24 receives the "I-Am-Router-To-Network-A" message from the third routing device 28 at its computer port 2B 148. The second routing device 24 compares the port at which it had originally received the request from the first routing device 20 with the port at which it received the "I-Am-Router-To-Network-A" message from the third routing device 28. Since the ports differ, the second routing device 24 updates its second routing table 152 with the information that the third routing device 28 is a router to the network A 160.

For the situation when the first routing device 20 wishes to know the routing information to transfer a message to network C 176, the first routing device 20 issues a request for such routing information onto the Ethernet cable 132. The second routing device 24 receives that request at its computer port 2A 140 and records that information. The fourth routing device 172 responds to the request from the first routing device 20 by issuing "I-Am-Router-To-Network-C" message. The second routing device 24 receives this message from the fourth routing device 172 at its computer port 2A 140. It compares the port at which it received the request from the first routing device 20 with the port at which it received the message from the fourth routing device 172. Since the "I-Am-Router-ToNetwork-C" message is received for this destination network on the same port as the request by the first routing device 20, the second routing device 24 does not update its second routing table 152 with that routing information. This "I-Am-Router-To-Network-C" message can be safely discarded since the first routing device 20 is looking for a destination network which does not bridge the router.

It is to be understood that there are other ways by which the present invention can determine whether a particular routing device acts as a bridge between two routing devices. For example, a routing device may provide routing information to another routing device based upon periodic intervals and not solely upon requests by another routing device. Also, it is to be understood that the present invention uses the term "bridge" in the more expansive term as connecting routing devices whether they operate on similar or dissimilar networks (i.e. whether they act in a gateway capacity).

The routers of FIG. 5 transfer messages to various devices which exist on the ASHRAE BACnet. In accordance with the ASHRAE BACnet communications protocol, the devices on the network use the BACnet object identifiers to perform such data operations as one device providing values for a particular property of an object as requested by another device. These devices can include control devices as may operate within a building automation and control network. To overcome the transfer of erroneous information between two computer processes which may operate on two separate devices, the present invention proposes to segment the BACnet object identifier into two parts so that one of the parts may serve to validate the data operations between two computer processes. The term "property" refers to a particular characteristic of a physical process or device such as temperature, or display units, or sensitivity of the input. The term "object" is a well-known term within the object-oriented computer arts.

Figure 6:
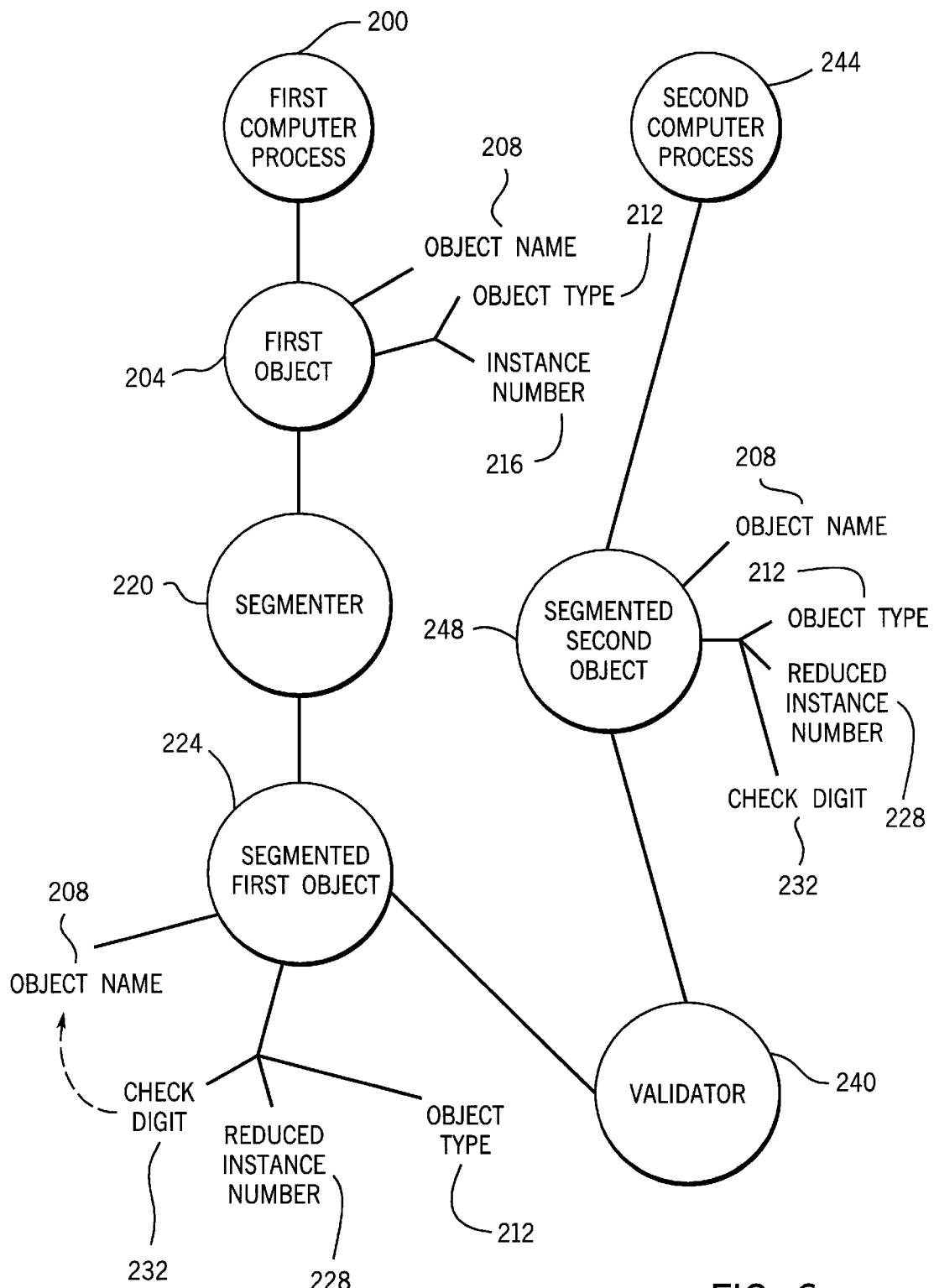
FIG. 6 is an entity relationship diagram depicting the relationships existing among the BACnet objects and the segmented objects of the present invention.

FIG. 6 is an entity relationship diagram showing the relationships and interconnections for the present invention to bind named objects to object identifiers within the BACnet communications protocol environment. A first computer process 200 has a first object 204. The first object 204 contains an object name 208, an object type 212 and an instance number 216. The first object 204 may, for example, have an object name 208 of "Supply Air Temp 1". The first object 204 may also have an object type as expressed in a binary format of ten bits long with a binary value of "1". The object type 212 serves the following function of specifying the class of the object (in this case, the object is an analog input). Lastly for example, the instance number 216 is a twenty-two bit binary formatted number which serves to uniquely identify each object within the device in which it resides.

A segmenter 220 segments the twenty-two bit instance number 216 of the first object 204 into two parts and is contained within a segmented first object 224. The first part (known as the reduced instance number 228) would retain the value of the instance number 216. The second part would be made into a check digit 232. For example, the first 16 bits of the instance number 216 (that is, those bits which occupy bit position zero to bit position fifteen) would remain within the reduced instance number 228 while the last six bits would become the check digit 232.

The check digit 232 would be set to a value based upon a reversible transformation of the object name 208. For example, the check digit 232 could be set to a six digit Cyclic Redundancy Code (CRC) resultant generated by dividing the text of the object name 208 by a generator polynomial.

CRC is a procedure to check for errors in data transmission. The error checking performed by the CRC procedures uses a complex calculation to generate a particular number based on the data transmitted. This procedure is known in the computer communications art and has been written about in such works as *Computer Networks*, by Andrew S. Tanenbaum, copyright 1981 by Prentice Hall, Inc. ISBN 0-13-165 183-8. The preferred embodiment uses a CRC calculation, but it is to be understood that many other data transmission error detection techniques could be used, such as checksums or Hamming codes.

By having the check digit 232 contained within the BACnet object identifier, the validity of every BACnet request can be made by the device servicing the request. The preferred embodiment uses six bits to hold the check digit 232. However, it is to be understood that the present invention includes other embodiments in which to improve the strength of the validity check, more bits of the instance number 216 could be reserved for the check digit 232.

The preferred embodiment uses a validator 240 to validate whether a data operation between a second computer process 244 and the first computer process 200 is valid based upon the referenced object identifier 248 of the second computer process 244 being compared against the segmented first object 224. If the two are the same, then the validator 240 allows the data operation to continue. However, if the two are dissimilar, then the validator signals that the data operation is based upon faulty operation. In the preferred embodiment, the data operation is terminated and an error message is sent to the second computer process 244 that it is using erroneous information to perform its data operations.

Figure 7A:
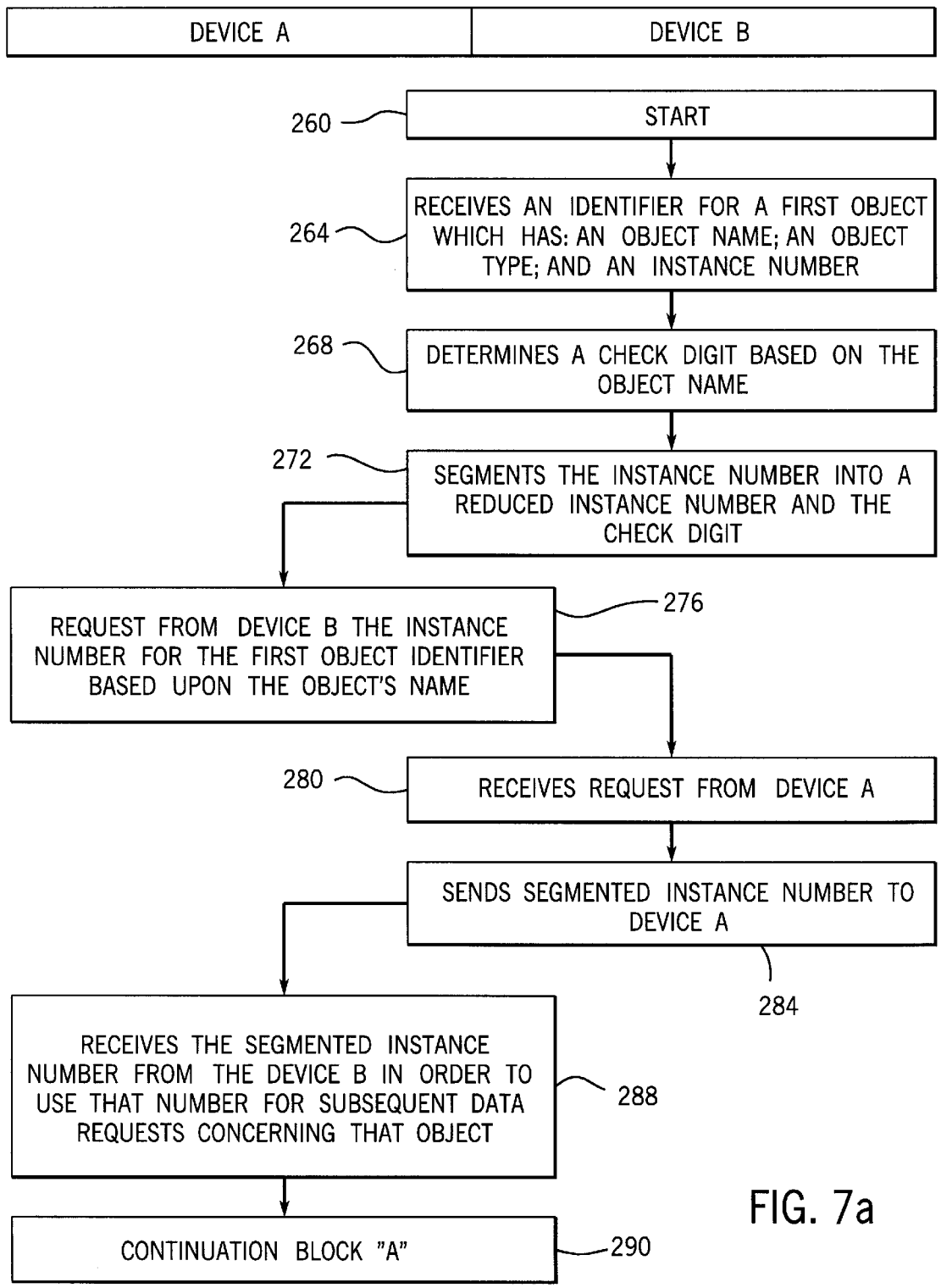
FIGS. 7a and 7b are flow charts depicting the steps for validating data operations between two devices based upon objects which have been segmented by the present invention.

FIG. 7a is a flow chart showing the various steps that two processes operating on two separate devices can do in performing the validation steps of the present invention. The start indicator block 260 indicates that operations begin at block 264. At block 264, device B receives an identifier for a first object. The first object has: an object name; an object type; and instance number. Block 268 determines for device B a check digit based upon the object name. Block 272 segments the instance number into a reduced instance number and the check digit for device B.

At a point in the operations, device A requests from device B the instance number for the first object identifier based upon the object's name. This operation is performed at block 276. Device B receives the request from device A at block 280 and sends the segmented instance number to device A at block 284. At block 288, device A receives the segmented instance number from device B and will use that number for subsequent data request concerning that object. Processing then continues at continuation block "A" 290.

Figure 7B:
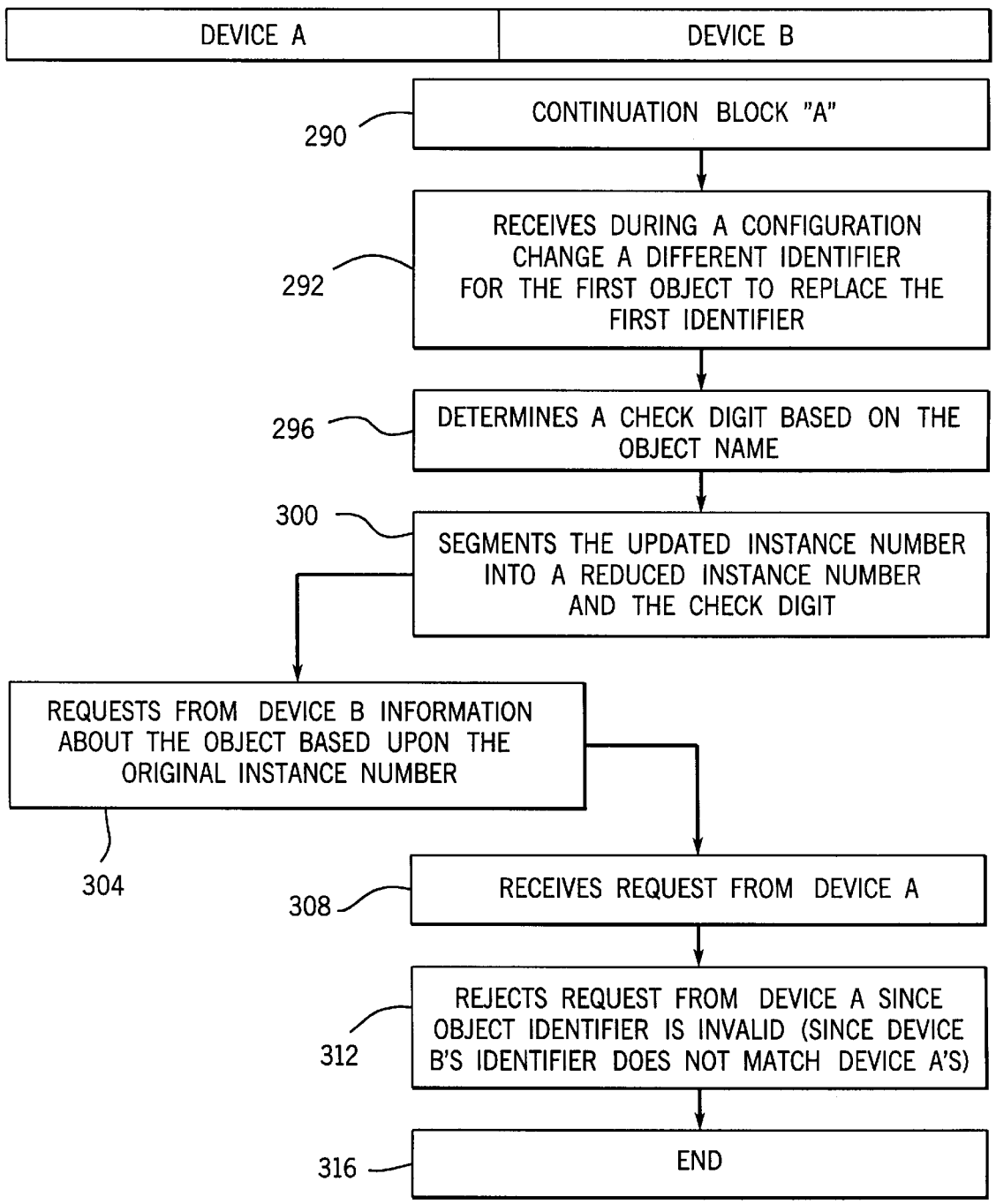

On FIG. 7b, continuation block "A" 290 indicates that processing continues at block 292. At block 292, device B receives a different identifier for the first object which replaces the first identifier. Device B may receive such changes to its objects during, for example, a configuration change. At block 296, device B determines a check digit based upon the object name, and at block 300 it segments the updated instance number into a reduced instance number and the recently calculated check digit.

At a later point, at block 304, device A requests from device B information about the object based upon the original instance number sent to device A. At block 308, device B receives the request from device A. At block 312, device B performs a validation check by comparing the instance number contained in the request from device B with the instance number currently within the device A. Device B rejects the request from device A since the object identifier is invalid since device B's identifier does not match device A's identifier. Processing terminates at the end indicator block 316.

Figure 8:
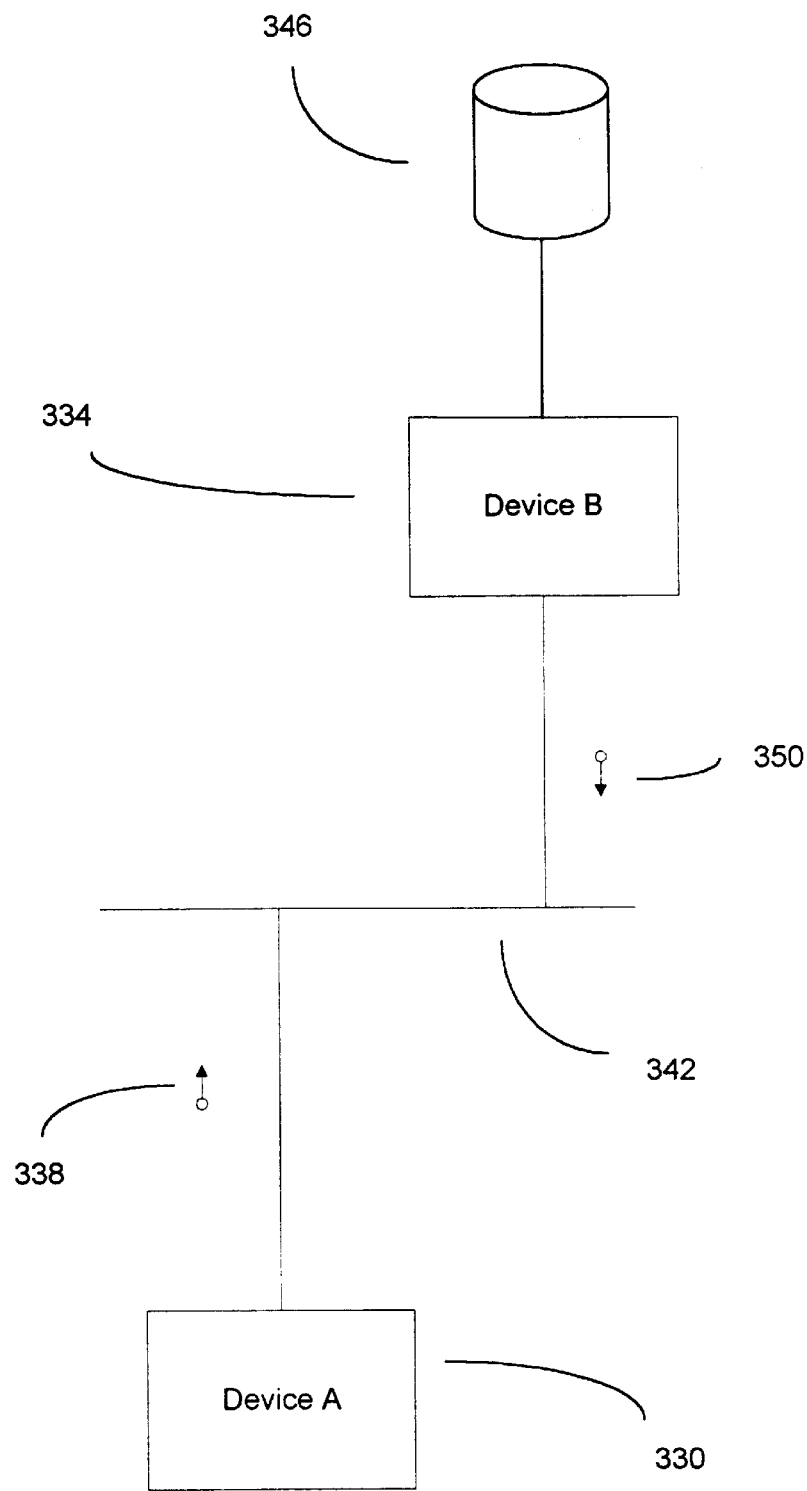
FIG. 8 is a network schematic showing one possible arrangement between two devices using segmented objects to validate data operations according to the present invention.

FIG. 8 provides an example of how device A 330 and device B 334 may be arranged within a network environment. Device A 330 may perform such data operations as data requests 338 on bus 342. Device B 334 may be connected to bus 342 and based upon the information that it has stored within its database 346, device B 334 will send back information 350 to device A 330 on bus 342.

FIGS. 9 and 10 provide a detailed example of how the present invention uses the check digit to perform validations of data operations. FIG. 9 shows a set of objects that have been configured into the database of device B after the objects have been segmented. The results of the segmentation of the objects contained in FIG. 1 are shown in FIG. 9. The results of the segmentation process of the objects in FIG. 2 are shown in FIG. 10.

The check digits were formed by dividing a generator polynomial "G(x)" into the object names binary representation "M(x)". For example, the preferred embodiment uses a generator polynomial of $G(x)=X^5+X^4+1$. A sample calculation using the object name of "Supply Air Temp 1" would be:

$$M(x) = \begin{array}{|c|c|c|c|} \hline S & u & p & p \\ 01010011 & 01110101 & 01110000 & 01110000 \\ \hline l & y & \text{space} & A \\ 01101100 & 01111001 & 00100000 & 01000001 \\ \hline i & r & \text{space} & T \\ 01101001 & 01110010 & 00100000 & 01010100 \\ \hline 1 & \multicolumn{3}{c|}{\text{appendage of zeros of the same size as } (G(x)-1)} \\ 00110001 & \multicolumn{3}{c|}{0000} \\ \hline \end{array}$$

G(x)=1 0 0 0 1 1

M(x)/G(x)=check digit=0 0 1 1 0

This check digit for "Supply Air Temp 1" appears in FIG. 9 in the first row.

If device A would like to read the object whose object name is "Supply Air Temp 1", it does so by binding to the object using a BACnet WhoHas message. The request for this message contains the text "Supply Air Temp 1". The response contains the object identifier=00400046 (in hexadecimal). This is stored by device A for later use. Device A uses 00400046 in a ReadProperty message to read the "Supply Air Temp 1". This message only accepts an object identifier as an argument, it will not accept a text name.

Within this example, device B has its database and its objects changed in order to add a new application. Its new database is shown in FIG. 10. Device A uses 00400046 in a ReadProperty message to read the "Supply Air Temp 1"; but since the database of device B has been changed, device B rejects message since the object identifier is invalid. In the case where the object identifier is valid, device B would perform the inverse CRC operation to insure that the remainder "R(x)=0 or it would again reject the request. Since device A knows that it has an invalid object identifier, it rebinds to the named object and proceeds with its normal operations. Device B would now return an object identifier= 004000C6 for the "Supply Air Temp 1" object.

The embodiments which have been set forth above were for the purpose of illustration and were not intended to limit the invention. It will be appreciated by those skilled in the art that various changes and modifications may be made to the embodiments discussed in this specification without departing from the spirit and scope of the invention as defined by the appended claims.

I claim:

1. An apparatus for updating a message routing table within a building environment control system with message routing information, said message routing information being indicative of a third message router being capable of transferring messages between a first message router and a building environment message destination device, comprising:

a second message router capable of exchanging said message routing information with said first and third message routers, said second message router being coupled to said message routing table for storing said message routing information, said first and second and third message routers routing said message routing information within said building environmental control system;

a message bridge determinator coupled to said second message router for determining whether said second message router is a bridge for transferring said message routing information from said first message router to said message destination device through said third message router; and a table updater coupled to said second message router and to said message bridge determinator and to said message routing table for updating said message routing table with said message routing information when said message bridge determinator determines said second message router is said bridge and for not updating said message routing table with said message routing information when said message bridge determinator determines said second message router is not said bridge.

2. The Apparatus according to claim 1 wherein said first router is connected to a first network and said message destination device is connected to a second network.

3. The Apparatus according to claim 1 wherein said bridge determinator means includes a first and second communication port, said bridge determinator means determines if said second router is a bridge if said messages passes between said first and second ports of said second router.

4. The Apparatus according to claim 1 wherein said table updater deletes the oldest message routing information entry in said message routing.

5. The Apparatus according to claim 1 wherein said messages conform to the American Society of Heating Refrigeration and Air Conditioning (ASHRAE) Building Automation and Control Network (BACNet) communication protocol standard.

6. The Apparatus according to claim 5 wherein said third message router routes messages to a network and wherein said message routing information contains said third message router being a communications hop for said network.

7. A method for ensuring consistency of data between a first and second computer application operating within a building environmental control system, said data being based on objects of said first and second computer applications, each of said objects having an identifier number of a predefined length and a name, comprising the following steps:

determining a check number based on the name of an object;

segmenting the identifier number of said object to produce a segmented identifier number formed by a combination of a reduced identifier number and said check number, said reduced identifier number and said check number being together the same length as said predefined length, said reduced identifier number representing the same value as said identifier number of said object;

providing said object with the segmented identifier number to said first and second computer applications; and exchanging said data between said first and second computer application when said object with the segmented identifier number of said first computer application matches the object with the segmented identifier of the second object.

8. The Method according to claim 7 wherein said check number is six bits in length and said reduced identifier number is sixteen bits in length.

9. The Method according to claim 7 wherein said objects are indicative of data within an American Society of Heating Refrigeration and Air Conditioning (ASHRAE) Building Automation and Control Network (BACNet).

10. The Method according to claim 9 wherein said objects have an object type and an instance number.

11. The Method according to claim 7 further comprising the step of determining said check number based on a data transmission error detection calculation.

12. The Method according to claim 11 wherein said data transmission error detection calculation is a Cyclic Redundancy Code calculation.

13. The Method according to claim 12 wherein said Cyclic Redundancy Code calculation includes dividing the text value of said name of object by a generator polynomial.

* * * * *